US012669086B1

(12) United States Patent
Yazici et al.

(10) Patent No.: US 12,669,086 B1
(45) Date of Patent: Jun. 30, 2026

(54) AIRCRAFT AIR SYSTEM WITH BOOST COMPRESSOR(S)

(71) Applicant: RTX Corporation, Farmington, CT (US)

(72) Inventors: Murat Yazici, Glastonbury, CT (US); Thomas E. Clark, Wells, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/176,893

(22) Filed: Apr. 11, 2025

(51) Int. Cl.
| | |
|---|---|
| *F02C 6/00* | (2006.01) |
| *B64D 27/33* | (2024.01) |
| *B64D 33/02* | (2006.01) |
| *F02C 7/32* | (2006.01) |

(52) U.S. Cl.
CPC ............... *F02C 6/00* (2013.01); *B64D 27/33* (2024.01); *B64D 33/02* (2013.01); *F02C 7/32* (2013.01); *B64D 2033/0286* (2013.01)

(58) Field of Classification Search
CPC ...... F02C 6/08; F02C 6/00; F02C 7/32; F02C 7/047; F02C 9/18; F02C 6/04
See application file for complete search history.

(56) References Cited

U.S. PATENT DOCUMENTS

| | | | | |
|---|---|---|---|---|
| 8,967,528 | B2 * | 3/2015 | Mackin ..................... | F02C 6/08 |
| | | | | 244/134 R |
| 11,041,444 | B2 * | 6/2021 | Redford .................... | F02C 6/08 |
| 11,473,497 | B2 * | 10/2022 | Schwarz ................... | F02C 6/08 |
| 11,608,797 | B2 * | 3/2023 | Smith ..................... | B64D 31/18 |
| 11,788,465 | B2 * | 10/2023 | Miller ...................... | F02C 6/06 |
| | | | | 60/783 |
| 12,196,137 | B2 * | 1/2025 | Terwilliger ............... | F02C 7/18 |
| 2015/0275758 | A1 * | 10/2015 | Foutch ................... | F02C 7/047 |
| | | | | 60/785 |
| 2017/0268423 | A1 * | 9/2017 | Schwarz ............... | B64D 15/02 |
| 2017/0268430 | A1 * | 9/2017 | Schwarz .................. | F02C 9/18 |
| 2018/0051702 | A1 * | 2/2018 | Kupiszewski ......... | B64D 33/00 |
| 2019/0162121 | A1 * | 5/2019 | Staubach ................. | F02C 7/32 |
| 2019/0353103 | A1 * | 11/2019 | Roberge ................... | F02C 7/32 |
| 2020/0141326 | A1 * | 5/2020 | Redford ................... | F02C 9/18 |

(Continued)

FOREIGN PATENT DOCUMENTS

| | | | | | |
|---|---|---|---|---|---|
| JP | 2014181899 | A | * | 9/2014 | ............... F01D 9/02 |
| WO | WO-2025133702 | A2 | * | 6/2025 | ........... B01D 53/047 |

*Primary Examiner* — Craig Kim
(74) *Attorney, Agent, or Firm* — Getz Balich LLC

(57) ABSTRACT

An aircraft powerplant system includes a turbine engine and an accessory system. The turbine engine includes a core flowpath, a first rotating structure, a compressor section, a combustor section and a turbine section. The first rotating structure includes a first bladed rotor arranged along the core flowpath in the compressor section or the turbine section. The accessory system includes a first electromechanical apparatus, an air circuit and an air device. The first electromechanical apparatus includes a first electric machine and a first boost compressor. The first electric machine includes a first electric machine rotor that is operatively coupled to the first rotating structure. The first boost compressor includes a first boost compressor rotor that is operatively coupled to the first electric machine rotor and the first rotating structure. The air circuit is configured to direct air received from an air source, through the first boost compressor, to the air device.

16 Claims, 10 Drawing Sheets

(56)                    References Cited

U.S. PATENT DOCUMENTS

2020/0224592 A1*   7/2020  Snape ........................ F02K 3/06
2022/0252011 A1*   8/2022  Rambo ................... F02C 7/224
2022/0333533 A1*  10/2022  Burd ........................ F02C 7/36
2025/0007351 A1*   1/2025  Fowler ................... F01D 15/10
2025/0027424 A1*   1/2025  Philbrick ............... F01D 11/22

* cited by examiner

AIRCRAFT AIR SYSTEM WITH BOOST COMPRESSOR(S)

BACKGROUND OF THE DISCLOSURE

1. Technical Field

This disclosure relates generally to an aircraft and, more particularly, to an air system for the aircraft.

2. Background Information

An aircraft propulsion system may include one or more air systems. Various types and configurations of air systems are known in the art. While these air systems have various benefits, there is still room in the art for improvement.

SUMMARY OF THE DISCLOSURE

According to an aspect of the present disclosure, a system is provided for an aircraft powerplant. This system includes a turbine engine and an accessory system. The turbine engine includes a core flowpath, a first rotating structure, a compressor section, a combustor section and a turbine section. The core flowpath extends through the compressor section, the combustor section and the turbine section from an airflow inlet into the core flowpath to a combustion products exhaust from the core flowpath. The first rotating structure includes a first bladed rotor arranged along the core flowpath in the compressor section or the turbine section. The accessory system includes a first electromechanical apparatus, an air circuit and an air device. The first electromechanical apparatus includes a first electric machine and a first boost compressor. The first electric machine includes a first electric machine rotor that is operatively coupled to the first rotating structure. The first boost compressor includes a first boost compressor rotor that is operatively coupled to the first electric machine rotor and the first rotating structure. The air circuit is configured to direct air received from an air source, through the first boost compressor, to the air device.

According to another aspect of the present disclosure, another system is provided for an aircraft powerplant. This system includes a compressor section, a combustor section, a turbine section, a core flowpath, a first rotating structure, a first electric machine and an air system. The core flowpath extends through the compressor section, the combustor section and the turbine section from an airflow inlet into the core flowpath to a combustion products exhaust from the core flowpath. The first rotating structure includes a first bladed rotor arranged along the core flowpath in the compressor section or the turbine section. The first electric machine is operatively coupled to the first rotating structure. The air system is outside of the core flowpath. The air system includes a first boost compressor operatively coupled to the first rotating structure through the first electric machine.

According to still another aspect of the present disclosure, another system is provided for an aircraft powerplant. This system includes a compressor section, a combustor section, a turbine section, a core flowpath, a first rotating structure, an air system and a first electric machine. The core flowpath extends through the compressor section, the combustor section and the turbine section from an airflow inlet into the core flowpath to a combustion products exhaust from the core flowpath. The first rotating structure includes a first bladed rotor arranged along the core flowpath in the compressor section or the turbine section. The air system is outside of the core flowpath. The air system includes a first boost compressor operatively coupled to the first rotating structure. The first electric machine is operatively coupled to the first rotating structure through the first boost compressor.

The first boost compressor rotor may be operatively coupled to the first rotating structure through the first electric machine rotor.

The first electric machine rotor may be operatively coupled to the first rotating structure through the first boost compressor rotor.

The first boost compressor rotor may be coaxial with the first electric machine rotor.

The first electromechanical apparatus may be configured such that the first electric machine rotor and the first boost compressor rotor rotate at a common rotational speed.

The first boost compressor rotor may be mechanically coupled to the first electric machine rotor through a clutch.

The system may also include an accessory gearbox. The first electromechanical apparatus may be mounted to the accessory gearbox. The first electromechanical apparatus may be operatively coupled to the first rotating structure through the accessory gearbox.

The first rotating structure may be configured to drive rotation of the first electric machine rotor and the first boost compressor rotor during a first mode of operation. The first electric machine rotor may be configured to drive rotation of the first boost compressor rotor during a second mode of operation.

The first electric machine rotor may also be configured to at least partially drive rotation of the first rotating structure during the second mode of operation.

The turbine engine may also include a second rotating structure. The second rotating structure may include a second bladed rotor arranged along the core flowpath in the compressor section or the turbine section. The accessory system may also include a second electromechanical apparatus. The second electromechanical apparatus may include a second electric machine and a second boost compressor. The second electric machine may include a second electric machine rotor that is operatively coupled to the second rotating structure. The second boost compressor may include a second boost compressor rotor that is operatively coupled to the second electric machine rotor and the second rotating structure. The air circuit may be configured to further direct the air received from the air source, through the second boost compressor, to the air device.

The first boost compressor and the second boost compressor may be fluidly coupled in parallel along the air circuit.

The first boost compressor and the second boost compressor may be fluidly coupled in series along the air circuit.

The turbine engine may also include a second rotating structure. The second rotating structure may include a second bladed rotor arranged along the core flowpath in the compressor section or the turbine section. The accessory system may also include a second electromechanical apparatus. The second electromechanical apparatus may include a second electric machine and a second boost compressor. The second electric machine may include a second electric machine rotor that is operatively coupled to the second rotating structure. The second boost compressor may include a second boost compressor rotor that is operatively coupled to the second electric machine rotor and the second rotating structure. The air circuit may be configured to further direct the air received from the air source, through the second boost compressor, to a second air device.

The system may also include a bypass flowpath bypassing the compressor section, the combustor section and/or the turbine section. The bypass flowpath may be configured as the air source.

The system may also include a housing structure forming a radial peripheral boundary of the bypass flowpath. An airflow inlet into the air circuit may be disposed with the housing structure at the radial peripheral boundary of the bypass flowpath.

The system may also include a vane structure extending radially across the bypass flowpath. An airflow inlet into the air circuit may be disposed with the vane structure.

The system may also include a heat exchanger fluidly coupled along the air circuit downstream of the first boost compressor.

The heat exchanger may be configured as or otherwise include a liquid-to-air heat exchanger.

The system may also include a housing structure. The housing structure may include an internal compartment radially outboard of a core of the turbine engine. The core of the turbine engine may include the compressor section, the combustor section and the turbine section. The air device may be configured to direct the air into the internal compartment.

The system may also include a clearance control system for the turbine engine.

The clearance control system may include the air device.

The air device may be configured to direct the air into a plenum next to the first electric machine to cool the first electric machine.

The system may also include a flow regulator fluidly coupled along the air circuit upstream of the first boost compressor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
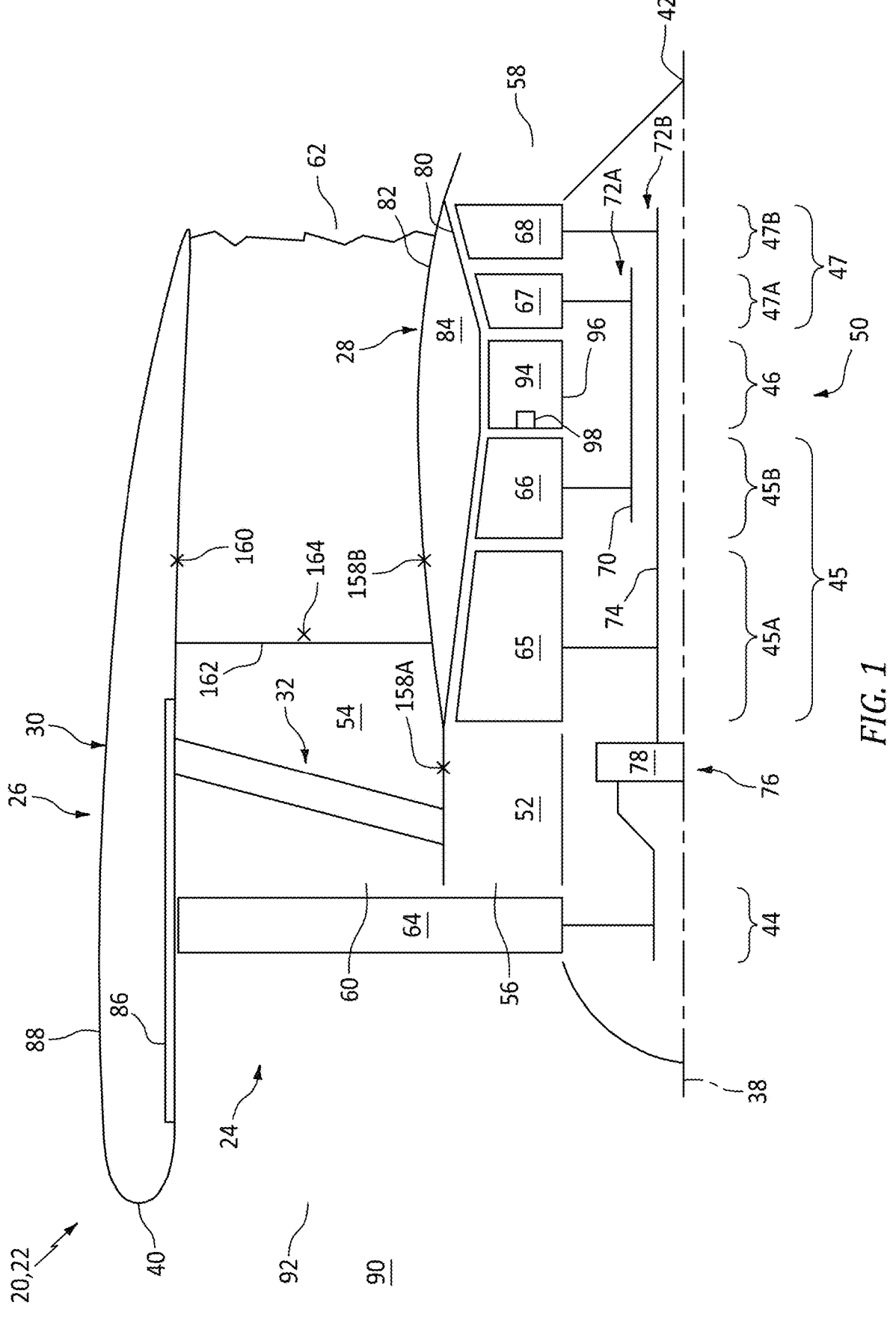
FIG. 1 is a partial schematic illustration of an aircraft propulsion system.

FIG. 1 illustrates a powerplant 20 for an aircraft. The aircraft may be an airplane, a drone (e.g., an unmanned aerial vehicle (UAV)) or any other manned or unmanned aerial vehicle or system. For ease of description, the aircraft powerplant 20 is described below as a propulsion system 22 for the aircraft and, more particularly, as a turbofan propulsion system. The aircraft powerplant 20 of the present disclosure, however, is not limited to such an exemplary propulsion system. The aircraft propulsion system 22, for example, may alternatively be configured as a turbojet propulsion system, a turboprop propulsion system, a turboshaft propulsion system, a propfan propulsion system, a pusher fan propulsion system, or any other type of ducted and/or open propulsor rotor propulsion system. Moreover, the aircraft powerplant 20 is not limited to propulsion system applications. The aircraft powerplant 20, for example, may also (or alternatively) be configured as an electrical power system for the aircraft; e.g., an auxiliary power unit (APU).

The aircraft propulsion system 22 includes a gas turbine engine 24 (e.g., a turbofan engine) housed within a stationary propulsion system housing 26, which propulsion system housing 26 of FIG. 1 includes an inner housing structure 28, an outer housing structure 30 and a guide vane structure 32 (e.g., a fan exit guide vane (FEGV) structure) extending radially between and connected to the inner housing structure 28 and the outer housing structure 30. The aircraft propulsion system 22 also includes an electric machine system 34 (see FIG. 2) and an air system 36 (see FIG. 3), where the electric machine system 34 and the air system 36 are part of an accessory system for the aircraft propulsion system 22 and its turbine engine 24. The aircraft propulsion system 22 extends axially along an axis 38 the aircraft propulsion system 22 between an axial upstream, forward end 40 of the aircraft propulsion system 22 and an axial downstream, aft end 42 of the aircraft propulsion system 22. Briefly, the propulsion system axis 38 may be a centerline axis of the aircraft propulsion system 22, the turbine engine 24 and/or one or more of its members. The propulsion system axis 38 may also or alternatively be a rotational axis for one or more members of the turbine engine 24.

The aircraft propulsion system 22 and its turbine engine 24 of FIG. 1 include a propulsor section 44 (e.g., a fan section), a compressor section 45, a combustor section 46 and a turbine section 47. The compressor section 45 of FIG. 1 includes a low pressure compressor (LPC) section 45A and a high pressure compressor (HPC) section 45B. The turbine section 47 of FIG. 1 includes a high pressure turbine (HPT) section 47A and a low pressure turbine (LPT) section 47B. At least (or only) the LPC section 45A, the HPC section 45B, the combustor section 46, the HPT section 47A and the LPT section 47B collectively form a core 50 (e.g., a gas generator) of the turbine engine 24. The aircraft propulsion system 22 and its turbine engine 24 of FIG. 1 also include a core flowpath 52 (e.g., an annular core flowpath) and a bypass flowpath 54 (e.g., an annular bypass flowpath). The core flowpath 52 extends sequentially through the LPC section 45A, the HPC section 45B, the combustor section 46, the HPT section 47A and the LPT section 47B from an airflow inlet 56 into the core flowpath 52 to a combustion products exhaust 58 out from the core flowpath 52. The bypass flowpath 54 extends through a bypass duct from an airflow inlet 60 into the bypass flowpath 54 to an airflow exhaust 62 from the bypass flowpath 54, where the bypass duct may be formed by the inner housing structure 28 and the outer housing structure 30. The bypass flowpath 54 and its bypass duct are configured to bypass (e.g., are disposed radially outboard of and extend along) the engine core 50 and the inner housing structure 28.

The propulsor section 44, the LPC section 45A, the HPC section 45B, the combustor section 46, the HPT section 47A and the LPT section 47B may be arranged sequentially along the propulsion system axis 38 within the propulsion system housing 26. The propulsor section 44 includes a bladed propulsor rotor 64; e.g., a fan rotor. The LPC section 45A includes a bladed low pressure compressor (LPC) rotor 65. The HPC section 45B includes a bladed high pressure compressor (HPC) rotor 66. The HPT section 47A includes a bladed high pressure turbine (HPT) rotor 67. The LPT section 47B includes a bladed low pressure turbine (LPT) rotor 68. Each of these engine rotors 64-68 includes a rotor base (e.g., a disk or a hub) and a plurality of rotor blades (e.g., airfoils, vanes, etc.). The rotor blades may be arranged into one or more stages axially along the respective engine rotor 64-68. The rotor blades in each stage are arranged and may be equispaced circumferentially around the respective rotor base in an annular array. Each of the rotor blades is connected to the respective rotor base. The rotor blades, for example, may be formed integral with or mechanically fastened, welded, brazed and/or otherwise attached to the respective rotor base. Each of the rotor blades projects spanwise (e.g., radially) out from the respective rotor base to a distal tip of the respective rotor blade.

The HPC rotor 66 is coupled to and rotatable with the HPT rotor 67. The HPC rotor 66 of FIG. 1, for example, is connected to the HPT rotor 67 through a high speed shaft 70. At least (or only) the HPC rotor 66, the HPT rotor 67 and the high speed shaft 70 collectively form a high speed rotating structure 72A; e.g., a high speed spool of the turbine engine 24 and its engine core 50. This high speed rotating structure 72A of FIG. 1 and its members 66, 67 and 70 are rotatable about the propulsion system axis 38. However, it is contemplated the high speed rotating structure 72A may alternatively be rotatable about another axis radially and/or angularly offset from the rotational axis of the propulsor rotor 64 and/or the centerline axis of the turbine engine 24.

The LPC rotor 65 is coupled to and rotatable with the LPT rotor 68. The LPC rotor 65 of FIG. 1, for example, is connected to the LPT rotor 68 through a low speed shaft 74. At least (or only) the LPC rotor 65, the LPT rotor 68 and the low speed shaft 74 collectively form a low speed rotating structure 72B; e.g., a low speed spool of the turbine engine 24 and its engine core 50. This low speed rotating structure 72B of FIG. 1 and its members 65, 68 and 74 are rotatable about the propulsion system axis 38. However, it is contemplated the low speed rotating structure 72B may alternatively be rotatable about another axis radially and/or angularly offset from the rotational axis of the propulsor rotor 64 and/or the centerline axis of the turbine engine 24.

The low speed rotating structure 72B is coupled to the propulsor rotor 64 through a rotating structure-to-propulsor (RSP) drivetrain 76. The RSP drivetrain 76 may be configured as a geared drivetrain, where a geartrain 78 (e.g., a transmission, a speed change device, an epicyclic geartrain, etc.) is disposed between and operatively couples the propulsor rotor 64 to the low speed rotating structure 72B and its LPT rotor 68. With this arrangement, the propulsor rotor 64 may rotate at a different (e.g., slower) rotational speed than the low speed rotating structure 72B and its LPT rotor 68. Here, the propulsor rotor 64 and the low speed rotating structure 72B may rotate in a common (the same) direction about the propulsion system axis 38 or in opposite directions about the propulsion system axis 38 depending, for example, upon the specific configuration of the geartrain 78. Alternatively, the RSP drivetrain 76 may be configured as a direct-drive drivetrain, where the geartrain 78 is omitted. With such an arrangement, the propulsor rotor 64 rotates at a common (the same) rotational speed as the low speed rotating structure 72B and its LPT rotor 68.

The inner housing structure 28 of FIG. 1 includes an inner case 80 (e.g., a core case) for the turbine engine 24, an inner nacelle structure 82 (sometimes referred to as an inner fixed structure (IFS)) and an internal inner housing compartment 84 (e.g., an engine core compartment). The inner case 80 is disposed radially outboard of, extends axially along and may circumscribe one or more or all of the engine sections 45A-47B and the engine rotors 65-68. The inner case 80 may thereby house and provide a support structure for the respective engine sections 45A-47B and the engine rotors 65-68. The inner nacelle structure 82 is configured to provide an aerodynamic cover over the engine core 50 and its inner case 80. The inner housing compartment 84 of FIG. 1 is formed by and is disposed radially between the inner case 80 and an inner barrel of the inner nacelle structure 82. The inner housing structure 28 and its inner nacelle structure 82 may also form a radial inner peripheral boundary of the bypass flowpath 54.

The outer housing structure 30 of FIG. 1 includes an outer case 86 (e.g., a fan case) for the turbine engine 24 and an outer nacelle structure 88. The outer case 86 is disposed radially outboard of, extends axially along and may circumscribe the propulsor section 44 and its propulsor rotor 64. The outer case 86 may thereby house and may be configured as a containment structure for the propulsor section 44 and its propulsor rotor 64. The outer nacelle structure 88 is configured to provide an aerodynamic cover over the outer case 86. The outer housing structure 30 and its outer nacelle structure 88 may also form a radial outer peripheral boundary of the bypass flowpath 54.

During operation of the aircraft propulsion system 22 of FIG. 1, ambient air from an environment 90 external to the aircraft and its aircraft propulsion system 22 enters the aircraft propulsion system 22 and its turbine engine 24 through an airflow inlet 92. This air is propelled by the rotating propulsor rotor 64 in a downstream, aft direction towards the propulsion system aft end 42.

An outer stream of the air propelled by the rotating propulsor rotor 64 is directed into the bypass flowpath 54 through its bypass inlet 60, which air entering the bypass flowpath 54 may be referred to as "bypass air". The guide vane structure 32 conditions (e.g., straightens out, de-swirls, etc.) the flow of the bypass air within the bypass duct. This conditioned bypass air is subsequently directed out of the aircraft propulsion system 22 through the bypass exhaust 62 to provide forward thrust. This propulsion of the bypass air may account for a majority of the forward thrust generated by the aircraft propulsion system 22 and its turbine engine 24 of FIG. 1.

An inner stream of the air propelled by the rotating propulsor rotor 64 is directed into the core flowpath 52 through its core inlet 56, which air entering the core flowpath 52 may be referred to as "core air". This core air is compressed by the LPC rotor 65 and the HPC rotor 66 and is directed into a combustion chamber 94 (e.g., annular combustion chamber) of a combustor 96 (e.g., annular combustor) in the combustor section 46. Fuel is injected into the combustion chamber 94 by one or more fuel injectors 98 and mixed with the compressed core air to provide a fuel-air mixture. This fuel-air mixture is ignited and combustion products thereof flow through and sequentially drive rotation of the HPT rotor 67 and the LPT rotor 68. The rotation of the HPT rotor 67 and the LPT rotor 68 respectively drive rotation of the HPC rotor 66 and the LPC rotor 65 and, thus, compression of the air received from the core inlet 56. The rotation of the LPT rotor 68 also drives rotation of the propulsor rotor 64 through the RSP drivetrain 76.

Figure 2:
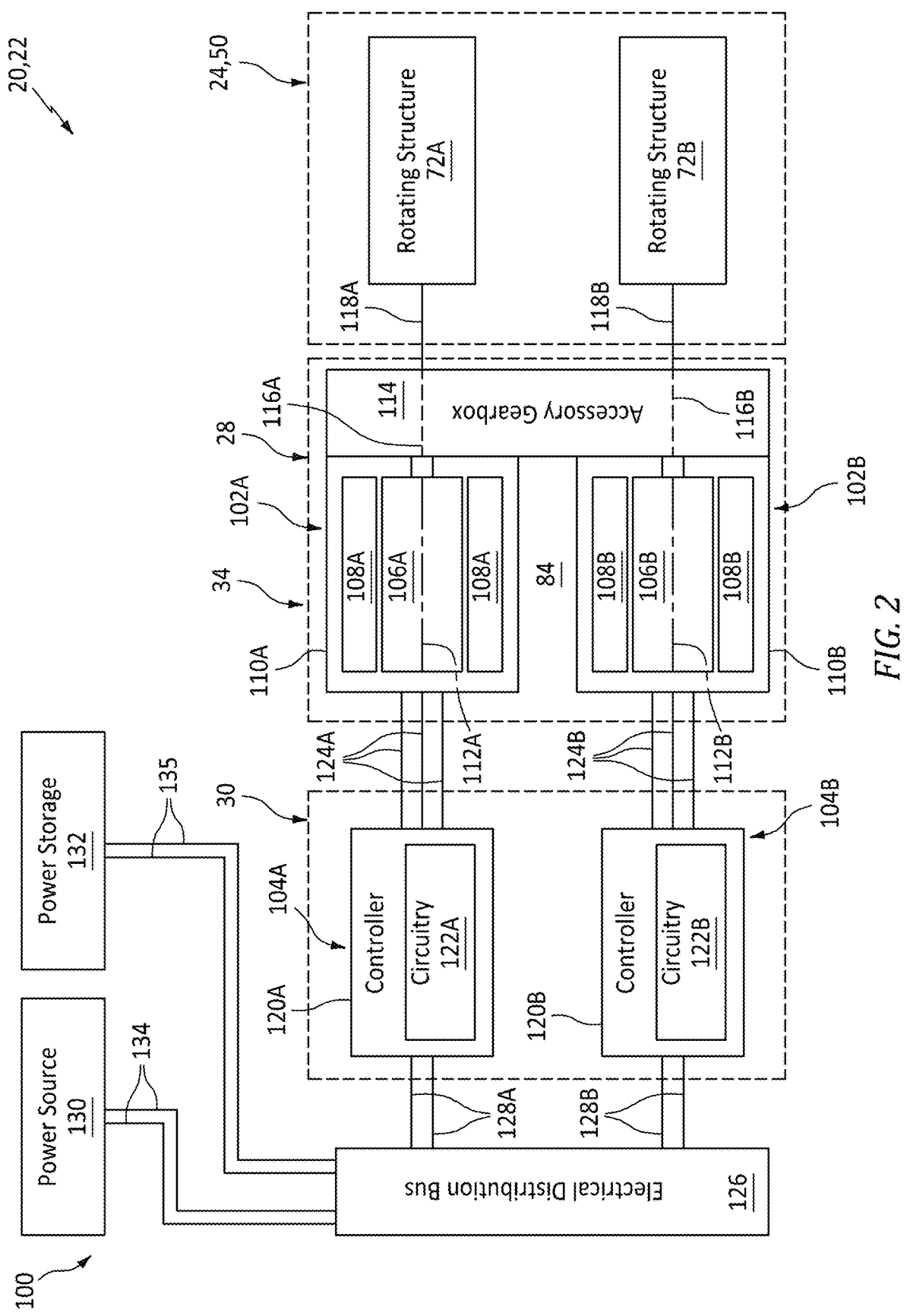
FIG. 2 is a schematic illustration of a portion of the aircraft propulsion system with an electric machine system.

Referring to FIG. 2, the electric machine system 34 is electrically coupled to an electrical system 100 for the aircraft and its aircraft propulsion system 22. The electric machine system 34 of FIG. 2 includes one or more electric machines 102A, 102B (generally referred to as "102") and one or more electric machine (EM) controllers 104A, 104B (generally referred to as "104"). For ease of description, each electric machine 102 of FIG. 2 is described below as being electrically coupled to, controlled by and/or otherwise associated with a single, dedicated one of the EM controllers 104. However, it is contemplated a single EM controller may alternatively be electrically coupled to, may control and/or may otherwise be associated with multiple electric machines. It is also contemplated multiple EM controllers may be electrically coupled to, may control and/or may otherwise be associated with one or more common electric machines.

Each electric machine 102A, 102B of FIG. 2 includes an electric machine rotor 106A, 106B (generally referred to as "106"), an electric machine stator 108A, 108B (generally referred to as "108") and an electric machine housing 110A, 110B (generally referred to as "110"); e.g., a case. The machine rotor 106A, 106B is rotatable about a rotational axis 112A, 112B (generally referred to as "112") of the machine rotor 106A, 106B, which machine axis 112 may also be an axial centerline of the electric machine 102. The machine stator 108 is disposed next to and in electromagnetic communication with the machine rotor 106. The machine stator 108 of FIG. 2, in particular, is radially outboard of and circumscribes the machine rotor 106. With this arrangement, each electric machine 102 is configured as a radial flux electric machine. The electric machines 102 of the present disclosure, however, are not limited to such an exemplary rotor-stator configuration nor to radial flux arrangements. The machine rotor 106, for example, may alternatively be radially outboard of and circumscribe the machine stator 108. In another example, the machine rotor 106 may be axially next to the machine stator 108 configuring the respective electric machine 102 as an axial flux electric machine. Referring again to FIG. 2, the machine rotor 106 and the machine stator 108 are at least partially or completely housed within and interior of the machine housing 110.

Each electric machine 102A, 102B is operatively coupled to a respective one of the engine rotating structures 72A, 72B (generally referred to as "72"). Each electric machine 102 of FIG. 2, for example, is mounted to an accessory gearbox 114 for the aircraft propulsion system 22 and its turbine engine 24. Each machine rotor 106A, 106B is mechanically coupled to a respective gear system 116A, 116B (generally referred to as "116") within the accessory gearbox 114. Each gearbox gear system 116 is mechanically coupled to the respective engine rotating structure 72A, 72B through a respective gearbox-to-core (GTC) drivetrain 118A, 118B (generally referred to as "118"); schematically shown. Each GTC drivetrain 118 may be configured as or otherwise include a shaft, a tower shaft assembly, another gearbox (e.g., an angle gearbox), and/or the like. For ease of description, each machine rotor 106 of FIG. 2 is described below as being coupled to and rotatable with a unique one of the engine rotating structures 72 of the aircraft propulsion system 22. However, it is contemplated multiple machine rotors may alternatively be coupled to and rotatable with a common engine rotating structure. It is also contemplated a single one of the machine rotors may be coupled to and rotatable with multiple engine rotating structures, directly or through another device such as a differential or a clutch system.

Each electric machine 102 of FIG. 2 may be configurable as an electric motor and/or an electric generator; e.g., an electric motor-generator. For example, during a motor mode of operation, a respective electric machine 102 may operate as the electric motor to convert electricity received from the aircraft electrical system 100. The machine stator 108, for example, may generate an electromagnetic field with the machine rotor 106 using a current of electricity received from the aircraft electrical system 100 through the respective EM controller 104. This electromagnetic field may drive rotation of the machine rotor 106. The machine rotor 106, in turn, may provide mechanical power to and drive rotation of the respective engine rotating structure 72 through the accessory gearbox 114 and the respective GTC drivetrain 118. This mechanical power may be provided to boost power or completely power the rotation of the respective engine rotating structure 72. By contrast, during a generator mode of operation, the electric machine 102 may operate as the electric generator to convert mechanical power received from the respective engine rotating structure 72 into electricity. Rotation of the machine rotor 106, for example, may be rotationally driven by rotation of the respective engine rotating structure 72 through the respective GTC drivetrain 118 and the accessory gearbox 114. The rotation of the machine rotor 106 may generate an electromagnetic field with the machine stator 108, and the machine stator 108 may convert energy from the electromagnetic field into electricity. The respective electric machine 102 may then provide a current of electricity to the aircraft electrical system 100 through the respective EM controller 104 for storage and/or further use. The electric machines 102 of the present disclosure, however, are not limited to such exemplary operation. For example, one, some or all of the electric machines 102 may alternatively each be configured as a dedicated electric generator; e.g., without the electric motor functionality. One, some or all of the electric machines 102 may alternatively each be configured as a dedicated electric motor; e.g., without the electric generator functionality.

Each EM controller 104A, 104B includes a controller housing 120A, 120B (generally referred to as "120") and internal controller circuitry 122A, 122B (generally referred to as "122"). The controller housing 120 may be configured as an enclosed case (e.g., a closed or sealed container) for the respective controller circuitry 122. The controller circuitry 122 is disposed within an interior of the controller housing 120; e.g., an internal chamber or other volume(s) within and enclosed by the controller housing 120. The controller circuitry 122 includes various electrical components, connectors and the like. Examples of the electrical components include, but are not limited to, printed circuit board(s) (PCB(s)), electrical inductor(s), electrical inverter(s), electrical amplifier(s), electrical switch(es) (e.g., contactor(s), relay(s), etc.), a processing device, memory, a communication module, electrical transformer(s), electrical rectifier(s), and/or the like.

Each EM controller 104A, 104B is electrically coupled to a respective one of the electric machines 102A, 102B through one or more electric cables 124A, 124B (generally referred to as "124"); e.g., high voltage electric cables, power feeder cables, etc. More particularly, the controller circuitry 122 of each EM controller 104 is electrically coupled to the respective electric machine 102 and its machine stator 108 through the respective electric cables

124. Similarly, each EM controller 104 is electrically coupled to an electrical distribution bus 126 of the aircraft electrical system 100 through one or more electric cables 128A, 128B (generally referred to as "128"); e.g., high voltage electric cables, power feeder cables, etc. More particularly, the controller circuitry 122 of each EM controller 104 is electrically coupled to the aircraft electrical system 100 and its electrical distribution bus 126 through the respective electric cables 128.

Each EM controller 104 and its controller circuitry 122 are configured to control operation of a respective one of the electric machines 102. For example, when operating as the electric motor, the respective EM controller 104 and its controller circuitry 122 are configured to regulate a flow of electricity from the aircraft electrical system 100 to the respective electric machine 102. This electricity flow regulation may include: (a) turning-on the flow of electricity from the aircraft electrical system 100 to the respective electric machine 102 (e.g., electrically coupling the respective electric machine 102 to the aircraft electrical system 100); (b) turning-off the flow of electricity from the aircraft electrical system 100 to the respective electric machine 102 (e.g., electrically decoupling the respective electric machine 102 from the aircraft electrical system 100); (c) moderating the flow of electricity from the aircraft electrical system 100 to the respective electric machine 102. Here, the respective EM controller 104 operates as a motor controller. In another example, when operating as the electric generator, the respective EM controller 104 and its controller circuitry 122 are configured to regulate a flow of electricity from the respective electric machine 102 to the aircraft electrical system 100. This electricity flow regulation may include: (a) turning-on the flow of electricity from the respective electric machine 102 to the aircraft electrical system 100 (e.g., electrically coupling the respective electric machine 102 to the aircraft electrical system 100); (b) turning-off the flow of electricity from the respective electric machine 102 to the aircraft electrical system 100 (e.g., electrically decoupling the respective electric machine 102 from the aircraft electrical system 100); (c) moderating the flow of electricity from the respective electric machine 102 to the aircraft electrical system 100. Here, the respective EM controller 104 operates as a generator controller.

The aircraft electrical system 100 includes the electrical distribution bus 126. This aircraft electrical system 100 may also include a power source 130 and/or a power storage 132. The electrical distribution bus 126 is electrically coupled to each of the electric machines 102 through their respective EM controllers 104. The electrical distribution bus 126 is also electrically coupled to the power source 130 and the power storage 132 through one or more respective electric cables 134 and 135; e.g., high voltage electric cables, power feeder cables, etc. Of course, the electrical distribution bus 126 may also be electrically coupled to one or more additional electric components of the aircraft propulsion system 22 and/or one or more additional electric components of the aircraft outside of the aircraft propulsion system 22; e.g., airframe mounted electric components, etc. With this arrangement, the electrical distribution bus 126 provides an intermediate connection between the various electrical members 102A (via 104A), 102B (via 104B), 130 and/or 132. The power source 130 may be an electric generator powered by the turbine engine 24 (see FIG. 1) or an electric generator powered by another aircraft powerplant; e.g., an engine of a companion aircraft propulsion system, an engine of an auxiliary power unit (APU), a fuel cell system, etc. The power storage 132 is configured to receive electricity from the electrical distribution bus 126 for storage. The power storage 132 is also configured to provide the stored electricity to the electrical distribution bus 126. The power storage 132, for example, may be configured as or otherwise include one or more electricity storage devices; e.g., batteries, super capacitors, etc. Of course, it is contemplated one of the electric machines 102A, 102B (e.g., operating as the electric generator(s)) may also or alternatively operate as a power source for another one of the electric machines 102B, 102A (e.g., operating as the electric motor(s)).

Figure 3:
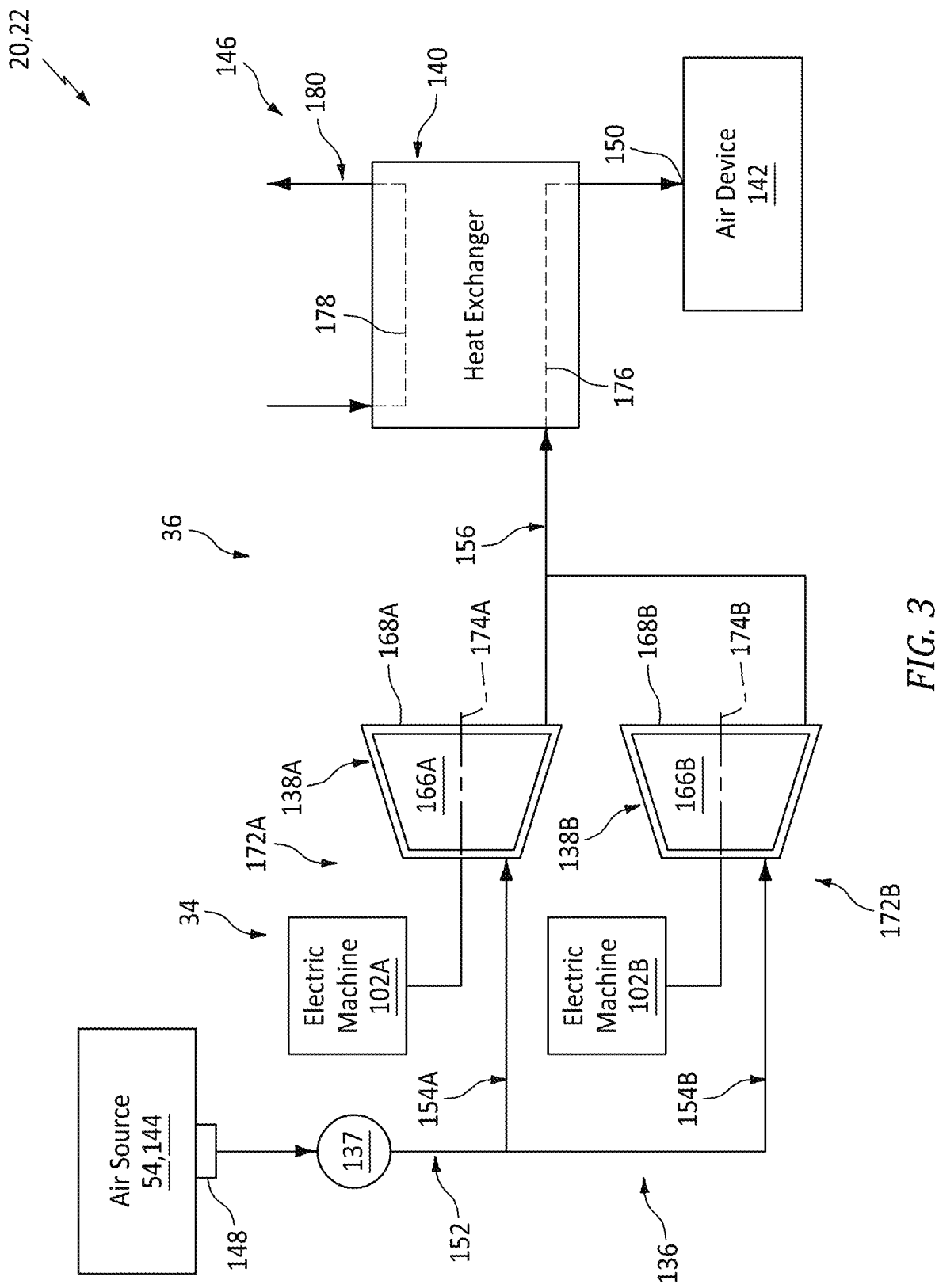
FIG. 3 is a schematic illustration of a portion of the aircraft propulsion system with an air system having parallel boost compressors.

Referring to FIG. 3, the air system 36 includes an air circuit 136, a flow regulator 137, one or more boost compressors 138A and 138B (generally referred to as "138"), a heat exchanger 140 and at least (or only) one air device 142. This air system 36 is configured to pressurize air received from an air source 144 using one or more of the boost compressors 138, and then provide that pressurized air to the air device 142 for further use. The air system 36 of FIG. 3 is also configured to condition the pressurized air using the heat exchanger 140 and/or provide a heat sink for a working fluid system 146 of the aircraft propulsion system 22 through the heat exchanger 140. The present disclosure, however, is not limited to such an exemplary arrangement and/or functionality. For example, in other embodiments, the air system 36 may be configured without (e.g., may omit) the flow regulator 137 and/or the heat exchanger 140. Some other alternative arrangements are described below in further detail.

The air circuit 136 is configured as an airflow passage (e.g., a single path airflow passage or a multi-path airflow passage) fluidly coupling the air source 144 to the air device 142. The air circuit 136 of FIG. 3, for example, extends longitudinally from an airflow inlet 148 (or multiple airflow inlets) into the air circuit 136 to at least (or only) one airflow outlet 150 from the air circuit 136. The circuit inlet 148 is fluidly coupled to the air source 144. The circuit outlet 150 is fluidly coupled to an airflow inlet into the air device 142. With the particular arrangement of FIG. 3, the air circuit 136 extends longitudinally from the air source 144, sequentially through the flow regulator 137, the boost compressors 138 and the heat exchanger 140, to the air device 142.

Figure 4A:
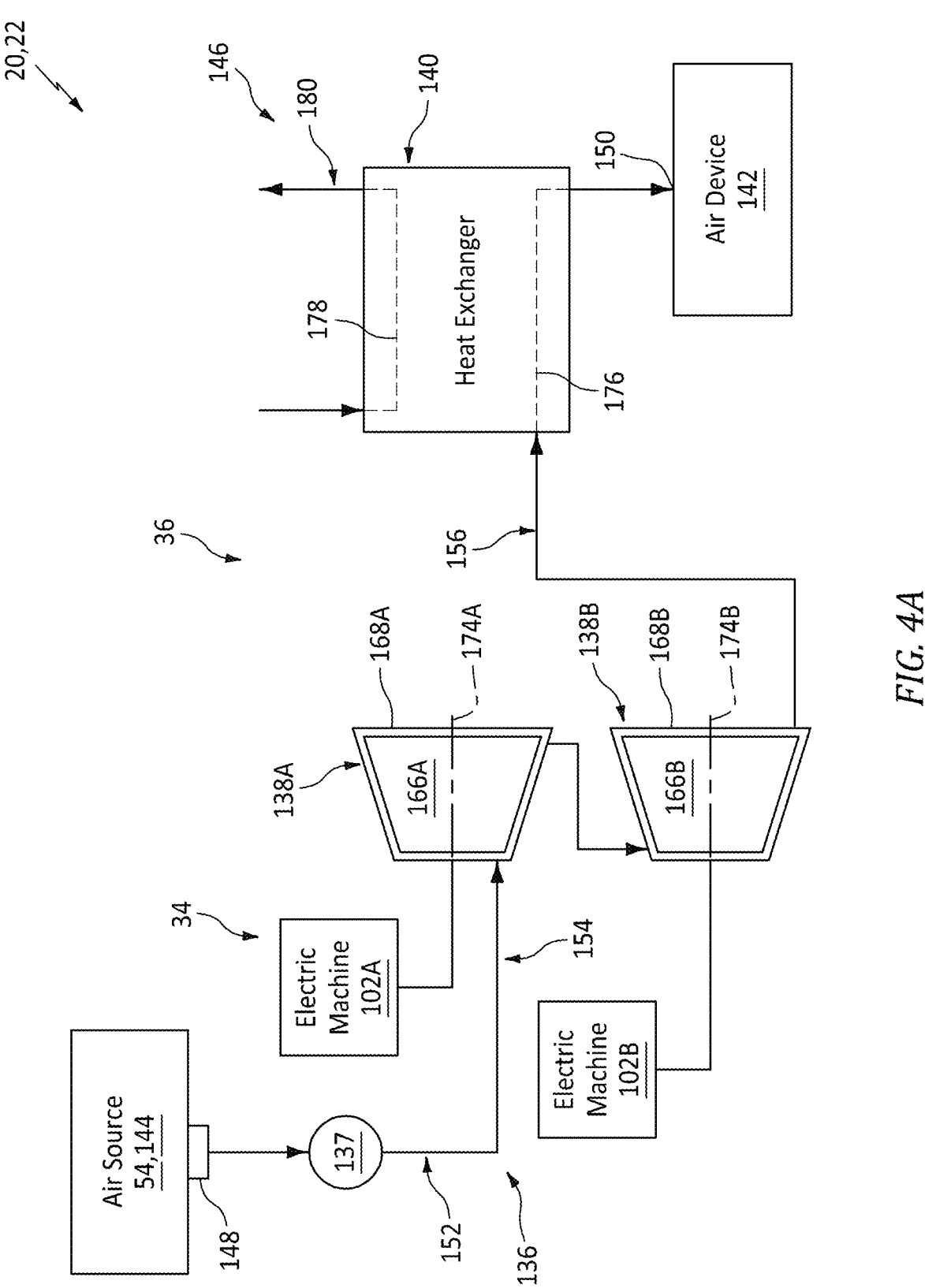
FIGS. 4A and 4B are schematic illustrations of portions of the aircraft propulsion system with the air system having serial boost compressors in various arrangements.

The air circuit 136 of FIG. 3 includes an upstream circuit leg 152, one or more parallel intermediate circuit legs 154A and 154B (generally referred to as "154") and a downstream circuit leg 156. The upstream circuit leg 152 extends longitudinally from the circuit inlet 148, through the flow regulator 137, to inlets into the intermediate circuit legs 154. Each of the intermediate circuit legs 154 extends longitudinally from an outlet from the upstream circuit leg 152, through a respective one of the boost compressors 138, to an inlet into the downstream circuit leg 156. With this arrangement, the intermediate circuit legs 154 and their associated boost compressors 138 are fluidly coupled in parallel between the upstream circuit leg 152 and the downstream circuit leg 156. The downstream circuit leg 156 extends longitudinally from outlets from the intermediate circuit legs 154, through the heat exchanger 140, to the circuit outlet 150. The air circuit 136 of the present disclosure, however, is not limited to such an exemplary arrangement. For example, referring to FIGS. 4A and 4B, the air circuit 136 may alternatively include a single one of the intermediate circuit legs 154 which extends serially through multiple of the boost compressors 138 between the upstream circuit leg 152 and the downstream circuit leg 156. With the arrangement of FIG. 4A, the first boost compressor 138A may be arranged upstream of the second boost compressor 138B along the air circuit 136 and its intermediate circuit leg 154.

Figure 4B:
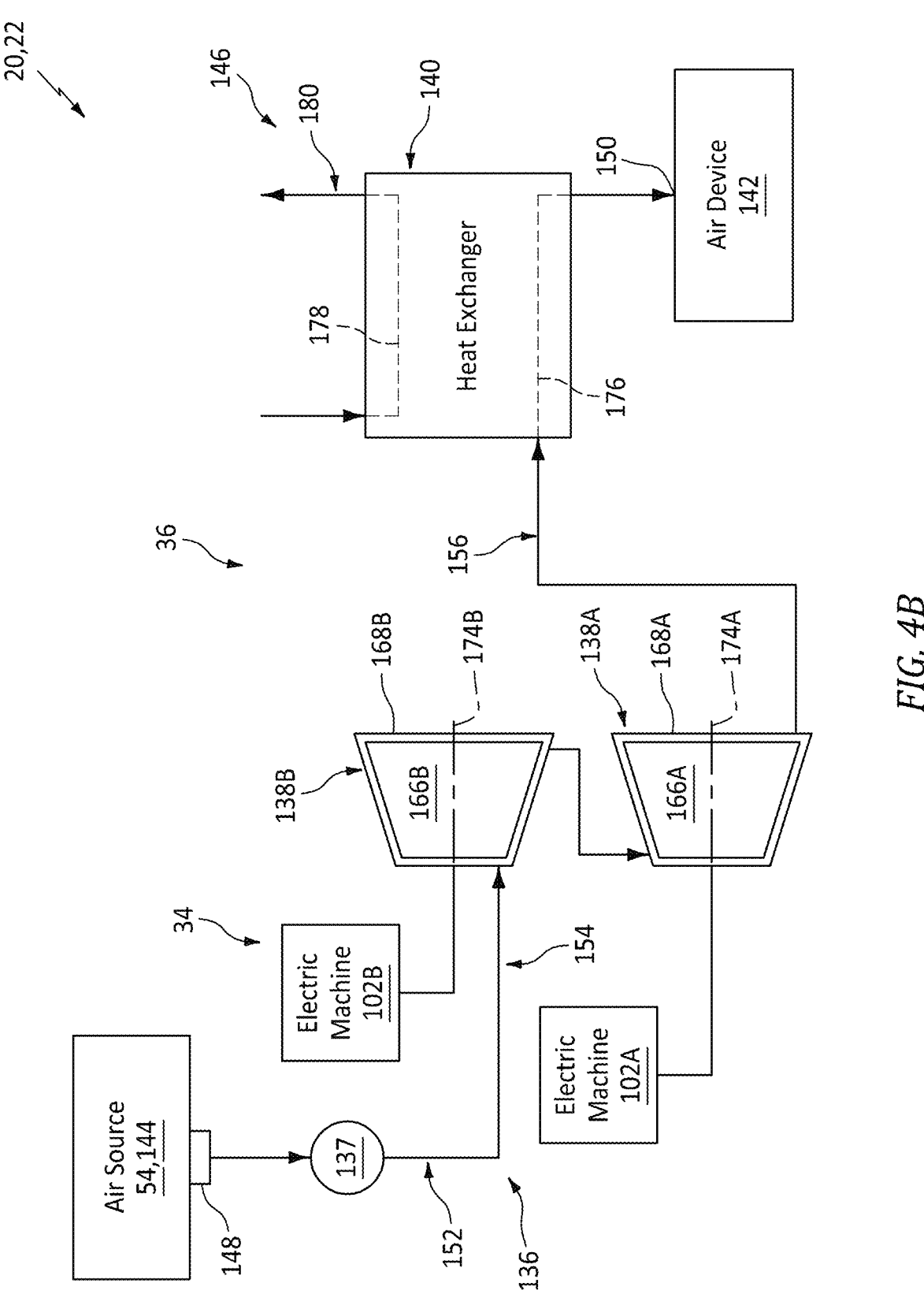

With the arrangement of FIG. 4B, the second boost compressor 138B may be arranged upstream of the first boost compressor 138A along the air circuit 136 and its intermediate circuit leg 154. Moreover, it is contemplated the air system 36 of the present disclosure may (or may not) also include one or more additional components arranged along the air circuit 136. Examples of these additional components may include, but are not limited to, air filter(s), additional heat exchanger(s), additional flow regulator(s), sensor device(s), etc.

Referring to FIG. 3, the air source 144 may be a source of air that is internal to the aircraft propulsion system 22. The air source 144, for example, may be configured as the bypass flowpath 54. With such a configuration, the circuit inlet 148 fluidly couples the bypass flowpath 54 to the air circuit 136 and its upstream circuit leg 152. Referring to both FIGS. 1 and 3, the circuit inlet 148 may be disposed at various locations along the bypass flowpath 54. For example, the circuit inlet 148 may be formed in and/or otherwise arranged with a wall of the inner housing structure 28 along the inner peripheral boundary of the bypass flowpath 54; e.g., see inner circuit locations 158A or 158B. In another example, the circuit inlet 148 may be formed in and/or otherwise arranged with a wall of the outer housing structure 30 along the outer peripheral boundary of the bypass flowpath 54; e.g., see outer circuit location 160. In still another example, the circuit inlet 148 may be formed in and/or otherwise arranged with a wall of a bifurcation structure 162 and/or another vane structure extending radially across the bypass flowpath 54 from the inner housing structure 28 to the outer housing structure 30. The circuit inlet 148 may thereby be disposed at a radial intermediate location 164 between the inner and the outer peripheral boundaries of the bypass flowpath 54. At any of the foregoing inlet locations 158A, 158B, 160 or 164, the circuit inlet 148 may be configured as or otherwise include a bleed port (or multiple bleed ports) and/or a scoop (or multiple scoops). The air system 36 of FIG. 3, however, is not limited to such an exemplary air source nor to such exemplary circuit inlet arrangements. For example, it is contemplated the air source 144 may alternatively be configured as another volume internal to the aircraft propulsion system 22 such as the core flowpath 52 (see FIG. 1). In still another example, it is contemplated the air source 144 may alternatively be configured as a volume external to the aircraft propulsion system 22 such as the external environment 90 (see FIG. 1).

The flow regulator 137 is fluidly coupled inline along the air circuit 136 between the air source 144 and the boost compressors 138. The flow regulator 137 of FIG. 3, for example, is fluidly coupled inline along the upstream circuit leg 152 between the circuit inlet 148 and the intermediate circuit legs 154. More particularly, the flow regulator 137 of FIG. 3 is longitudinally spaced downstream of the circuit inlet 148 along the upstream circuit leg 152. The air system 36 of the present disclosure, however, is not limited to such an exemplary arrangement. The flow regulator 137, for example, may alternatively be disposed adjacent or may form the circuit inlet 148. In another example, the flow regulator 137 may be arranged at an intersection between the upstream circuit leg 152 and the downstream circuit legs 156. With such an arrangement, it is contemplated the flow regulator 137 may selectively fluidly couple the upstream circuit leg 152 to the first intermediate circuit leg 154A and/or the second intermediate circuit leg 154B.

The flow regulator 137 is configured to regulate the flow of air directed through the air circuit 136 from the circuit inlet 148 to the boost compressors 138. The flow regulator 137, for example, may be configured as or otherwise include a flow diverter, a control valve or a valve system. With the flow regulator 137 open, the flow regulator 137 may fluidly couple (a) a section of the air circuit 136 and its upstream circuit leg 152 which is upstream of the flow regulator 137 to (b) a section of the air circuit 136 and its upstream circuit leg 152 which downstream of the flow regulator 137. With the flow regulator 137 closed, the flow regulator 137 may fluidly decouple (a) the upstream section of the air circuit 136 and its upstream circuit leg 152 from (b) the downstream section of the air circuit 136 and its upstream circuit leg 152 (or facilitate a minimum flow of the pressurized air from the upstream section to the downstream section). Of course, it is also contemplated the flow regulator 137 may partially open (or partially close) to facilitate an intermediate metered flow of the pressurized air from (a) the upstream section of the air circuit 136 and its upstream circuit leg 152 to (b) the downstream section of the air circuit 136 and its upstream circuit leg 152.

Each boost compressor 138 is configured to boost (e.g., increase) a pressure and/or a flow rate of the air flowing through the air circuit 136 and provided the heat exchanger 140 and/or the air device 142. Each boost compressor 138A, 138B of FIG. 3, for example, includes a respective boost compressor (BC) rotor 166A, 166B (generally referred to as "166") disposed within a respective boost compressor (BC) housing 168A, 168B (generally referred to as "168"); e.g., a case. Each BC rotor 166 includes a compressor base (e.g., a disk or a hub) and a plurality of compressor blades (e.g., airfoils, vanes, etc.). The compressor blades are arranged circumferentially around the compressor base in one or more annular arrays. Each of the compressor blades is connected to the compressor base. Each of the compressor blades projects spanwise (e.g., radially) out from the compressor base, into a flowpath of the respective intermediate circuit leg 154 within the BC housing 168, to a distal tip of the respective compressor blade.

Figures 5, 6:
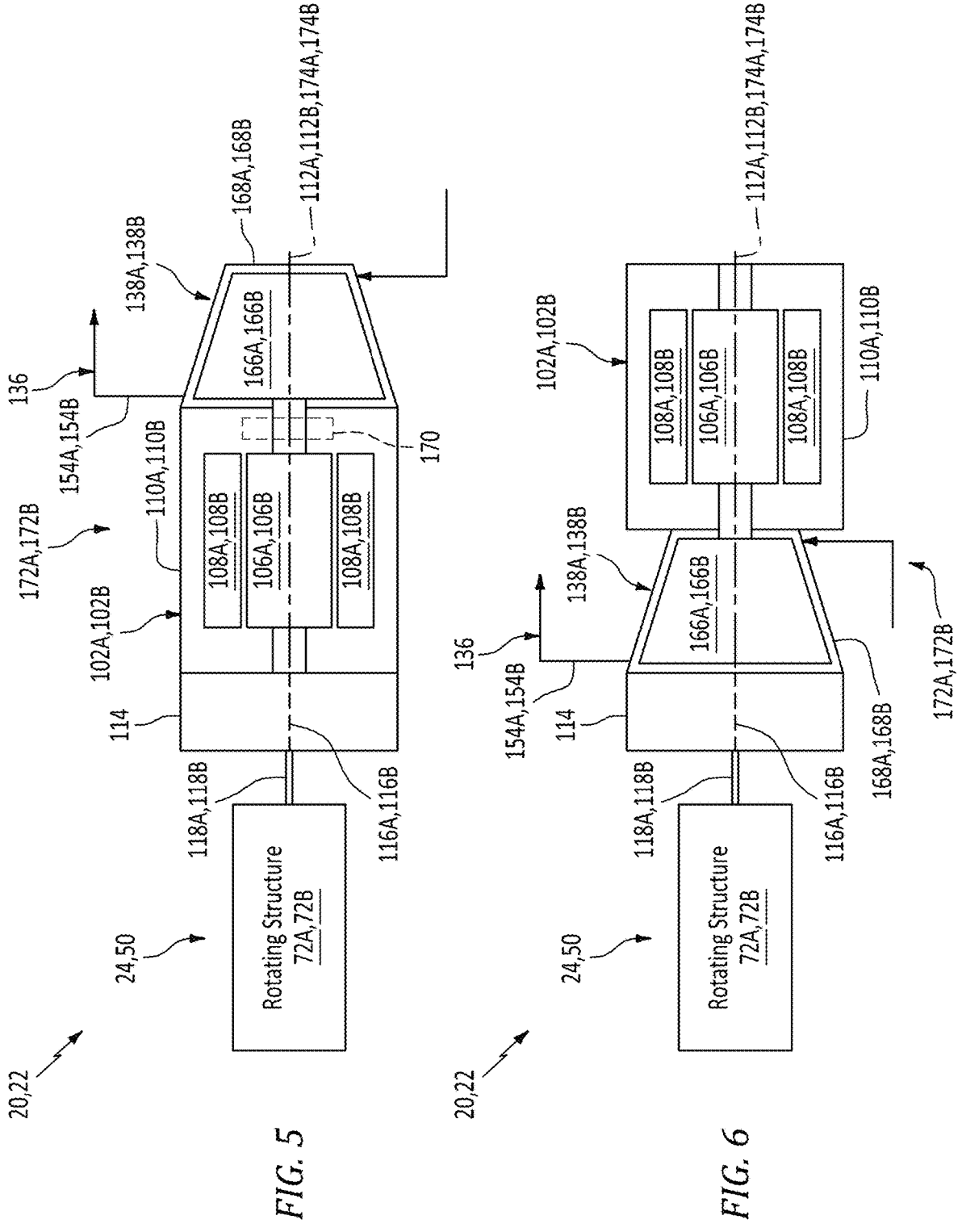
FIGS. 5 and 6 are schematic illustrations of portions of the aircraft propulsion system with various electromechanical apparatus arrangements.

Referring to FIGS. 5 and 6, the BC rotor 166 may be operatively coupled to and mechanically powered by (a) the turbine engine 24 and its engine core 50 and/or (b) a respective one of the electric machines 102. Each BC rotor 166 of FIGS. 5 and 6, for example, is mechanically coupled to a respective one of the engine rotating structures 72 and a respective one of the machine rotors 106.

The machine rotor 106 of FIG. 5 is arranged between and mechanically coupled to the accessory gearbox 114 and the BC rotor 166. With this arrangement, the BC rotor 166 may be rotationally driven by the respective engine rotating structure 72 through the respective GTC drivetrain 118, the accessory gearbox 114 and the respective machine rotor 106. The BC rotor 166 may also (or alternatively) be rotationally driven by the respective machine rotor 106. In some embodiments, there may be a constant coupling between the machine rotor 106 of FIG. 5 and the respective BC rotor 166. In other embodiments, a clutch 170 may be arranged between and operatively coupled to the machine rotor 106 of FIG. 5 and the respective BC rotor 166. In such embodiments, the clutch 170 may be disengaged such that the machine rotor 106 may rotate without driving the rotation of the BC rotor 166; e.g., when boost is not needed from the respective boost compressor 138.

The BC rotor 166 of FIG. 6 is arranged between and mechanically coupled to the accessory gearbox 114 and the respective machine rotor 106. With this arrangement, the BC rotor 166 may be rotationally driven by the respective engine rotating structure 72 through the respective GTC drivetrain 118 and the accessory gearbox 114, and independent of the respective machine rotor 106. The BC rotor 166 may also (or alternatively) be rotationally driven by the respective machine rotor 106.

With the arrangements of FIGS. 5 and 6, at least (or only) each respective set of the electric machine 102A, 102B and the boost compressor 138A, 138B collectively form a respective electromechanical apparatus 172A, 172B (generally referred to as "172"). This electromechanical apparatus 172 may be configured as a line replacement unit (LRU). Within the electromechanical apparatus 172, the machine rotor 106 and the BC rotor 166 may be coaxial. The machine rotor 106 may be mechanically coupled to the BC rotor 166 through a direct-drive coupling such that the machine rotor 106 and the BC rotor 166 rotate at a common rotational speed. The present disclosure, however, is not limited to such an exemplary electromechanical apparatus. For example, it is contemplated the axes 112A and 174A, 112B and 174B of the machine rotor 106A, 106B and the BC rotor 166A, 166B may be laterally and/or angularly offset. It is contemplated the machine rotor 106 may be mechanically coupled to the BC rotor 166 though a geared coupling such that the machine rotor 106 and the BC rotor 166 rotate at different rotational speeds. Moreover, with the arrangement of FIG. 5, it is contemplated the boost compressor 138 may also or alternatively be configured as a line replacement unit (LRU) independent of the respective electric machine 102. With the arrangement of FIG. 6, it is contemplated the electric machine 102 may also or alternatively be configured as a line replacement unit (LRU) independent of the respective boost compressor 138.

The heat exchanger 140 of FIG. 3 includes a plurality of fluidly discrete internal heat exchange passages 176 and 178. The air passage 176 of FIG. 3 is part of and is thereby fluidly coupled inline with the air circuit 136 and the downstream circuit leg 156. The fluid passage 178 of FIG. 3 is part of and is thereby fluidly coupled inline with a fluid circuit 180 of the working fluid system 146. These heat exchange passages 176 and 178 may be arranged to provide the heat exchanger 140 with a parallel flow configuration, a cross-flow configuration, a counterflow configuration, or a hybrid configuration including any two or more of the foregoing configurations. With this arrangement, the heat exchanger 140 is configured to exchange heat energy between (a) the pressurized air flowing through the air circuit 136 and its air passage 176 and (b) a working fluid flowing through the fluid circuit 180 and its fluid passage 178. Note, while the heat exchanger 140 is shown in FIG. 3 with a single air passage 176 and a single fluid passage 178 for ease of illustration, it is contemplated the heat exchanger 140 may include a network of the air passages 176 and/or a network of the fluid passages 178. Examples of the heat exchanger 140 include, but are not limited to: a liquid-to-air heat exchanger where the working fluid is a liquid working fluid; and a gas-to-air heat exchanger where the working fluid is a gaseous working fluid.

Briefly, the working fluid system 146 may be configured as a lubrication system and/or a thermal management system (TMS) for the aircraft propulsion system 22. The working fluid system 146, for example, may be configured to lubricate and/or cool one or more internal components of the turbine engine 24, such as bearings for the rotating structure(s) 72A, 72B (see FIG. 1), bearings and/or gears in the geartrain 78 (see FIG. 1), seal assemblies within the turbine engine 24, and/or the like. The working fluid system 146 may also or alternatively be configured to lubricate and/or cool one or more components of the accessory system, such as the electric machines 102, the EM controllers 104, bearings for the boost compressors 138, and/or the like. With such arrangements, the working fluid flowing through its fluid circuit 180 may be a liquid working fluid such as lubricant (e.g., engine oil) and/or coolant. The present disclosure, however, is not limited to such exemplary working fluid system configurations. The working fluid system 146, for example, may alternatively be configured as part of a hydraulic actuation system, a pneumatic actuation system, a fueldraulic actuation system, a fuel delivery system for the fuel injectors 98 (see FIG. 1), etc.

The air device 142 of FIG. 3 may be configured as an air exhausting device, an air distribution device, a pneumatic device, an air processing device and/or any other device which performs a function using the air received from the air circuit 136. For example, referring to FIG. 7, the air device 142 may be configured as an air nozzle, an air diffuser or another type of air exhausting device 182. In another example, referring to FIG. 8, the air device 142 may be configured as a device 184 (e.g., a manifold, an impingement duct, etc.) for a clearance control system 186; e.g., an active clearance control (ACC) system. In another example, referring to FIG. 9, the air device 142 may be configured as a cooling sleeve, a cooling jacket, a cooling shroud or another type of air cooling device 188.

Figures 7, 8:
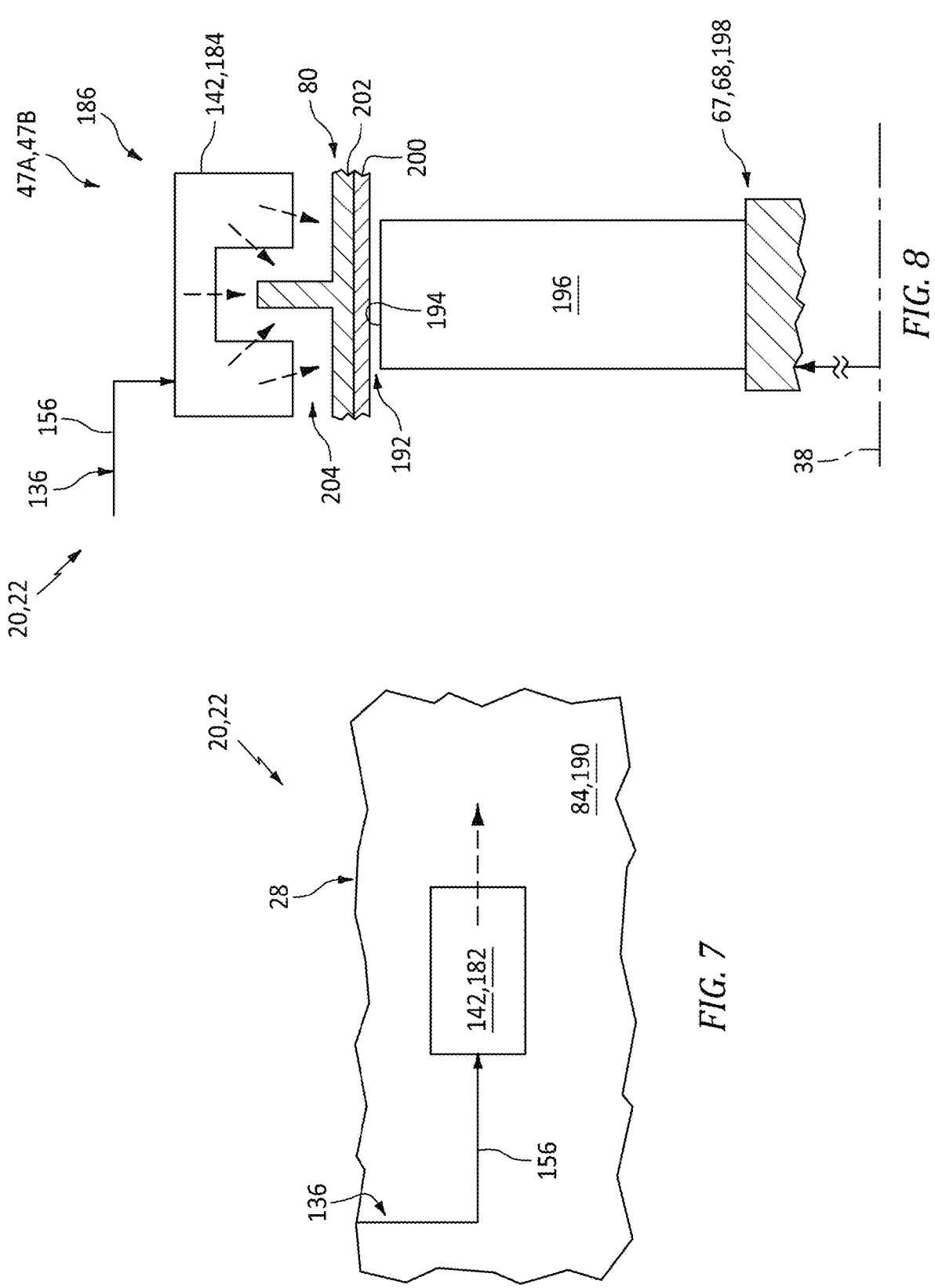
FIGS. 7-9 are schematic illustrations of portions of the aircraft propulsion system with various air device arrangements.

Referring to FIG. 7, the air exhausting device 182 may be configured to direct (e.g., exhaust) the pressurized air received from the boost compressor(s) 138 (see FIG. 3) through the air circuit 136 into an internal volume 190 of the aircraft propulsion system 22. This internal volume 190 may be configured as an internal compartment such as the inner housing compartment 84 (see also FIG. 1). With such an arrangement, the air exhausting device 182 of FIG. 7 may direct the air into the inner housing compartment 84 to vent the inner housing compartment 84. The air exhausting device 182 of FIG. 7 may also or alternatively direct the air into the inner housing compartment 84 to cool (e.g., impingement and/or convectively cool) one or more propulsion system components within and/or bordering the inner housing compartment 84. The present disclosure, however, is not limited to such an exemplary internal volume configuration. For example, the internal volume 190 may alternatively be configured as: a cooling plenum supplying cooling air to one or more internal components of the turbine engine 24; the bypass flowpath 54 (see FIG. 1); the core flowpath 52 (see FIG. 1); or another cavity, passage or flowpath within the aircraft propulsion system 22. Moreover, it is contemplated the air exhausting device 182 may still alternatively direct the air into a volume external to the aircraft propulsion system 22 such as the external environment 90 (see FIG. 1).

Referring to FIG. 8, the clearance control device 184 is configured to use the air received from the air circuit 136 to influence a radial clearance 192 between tips 194 of an array (e.g., a stage) of rotor blades 196 of an engine rotor 198 (e.g., the HPT rotor 67 of FIG. 1, the LPT rotor 68 of FIG. 1) and a surrounding outer shroud 200 (e.g., a blade outer air seal (BOAS)) for that rotor blade array. Here, the outer shroud 200 is supported by an engine casing 202, which engine casing 202 may form an axial section of the inner case 80. With this arrangement, the clearance control device 184 may direct the air received from the air circuit 136 into a plenum 204 surrounding the engine casing 202. This air may be directed into the plenum 204 to impinge against and/or otherwise cool the engine casing 202. By selectively cooling the engine casing 202 with the air jets, the radial clearance 192 between the outer shroud 200 and the blade tips 194 may be controlled; e.g., increased, decreased and/or maintained. For example, by increasing airflow provided to the clearance control device 184, additional cooling air directed into the plenum 204 increases cooling of the engine casing 202. This increased cooling may decrease a size (e.g., a diameter) of the engine casing 202 through thermal contraction of material forming the engine casing 202. The thermal contraction of the engine casing 202 in turn will locate circumferential segments of the outer shroud 200 further radially inboard towards the propulsion system axis 38; e.g., towards the blade tips 194. By contrast, by decreasing the airflow provided to the clearance control device 184, the cooling of the engine casing 202 decreases. This decreased cooling may allow the material forming the engine casing 202 to heat up and thermally expand, thereby increasing the size of the engine casing 202. The thermal expansion of the engine casing 202 in turn will locate circumferential segments of the outer shroud 200 further radially outboard away from the propulsion system axis 38; e.g., away from the blade tips 194. The clearance control device 184 of FIG. 8 may thereby control the radial clearance 192 using the air received from the air circuit 136.

Figure 9:
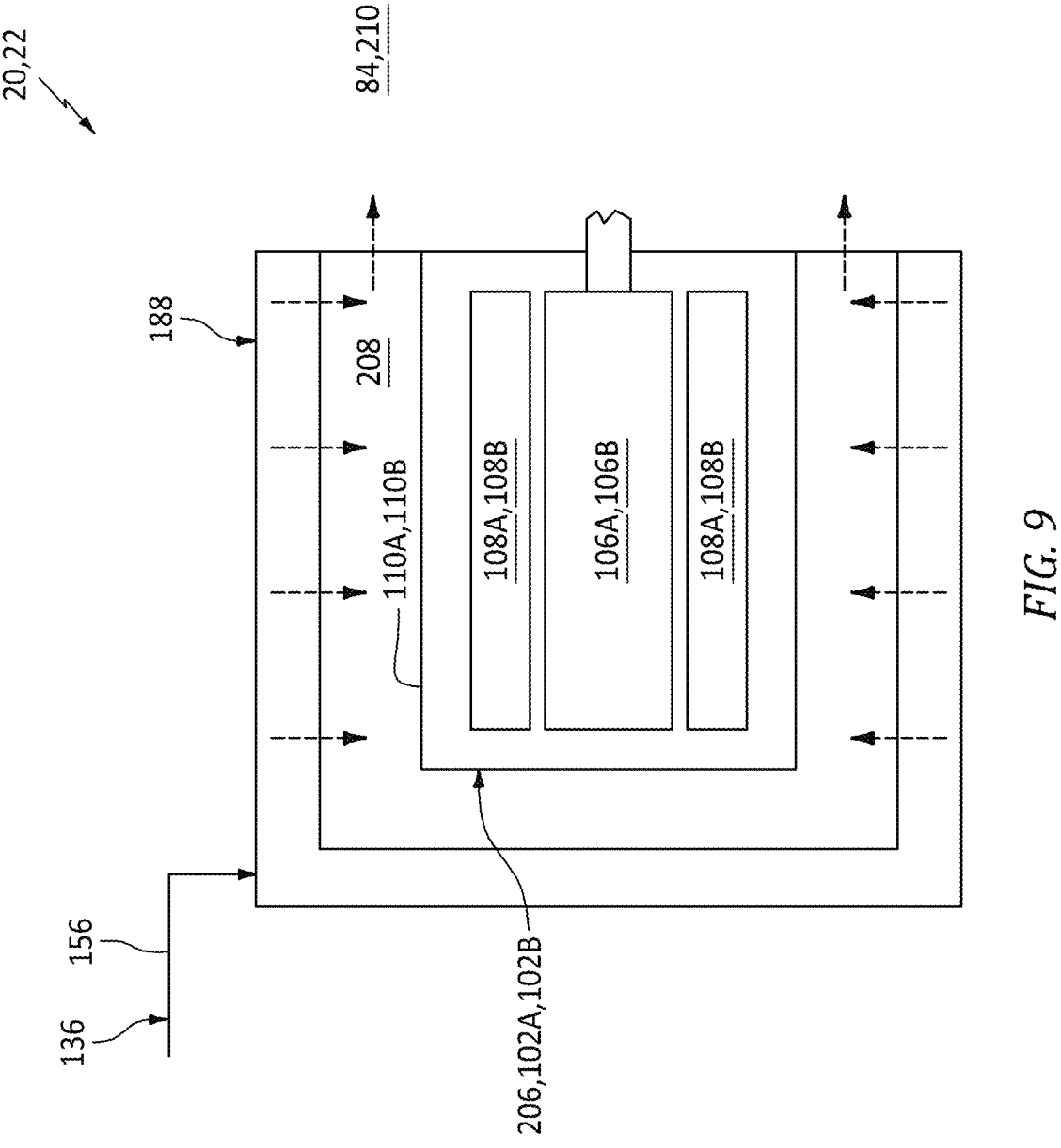

Referring to FIG. 9, the air cooling device 188 is configured to use the air received from the air circuit 136 to cool another component 206 of the aircraft propulsion system 22 such as a respective one of the electric machines 102. The air cooling device 188 of FIG. 9, for example, extends axially along and extends circumferentially about the respective propulsion system component 206. With this arrangement, the air cooling device 188 may direct the air received from the air circuit 136 into a plenum 208 surrounding the propulsion system component 206. This air may be directed into the plenum 208 to impinge against and/or otherwise cool the propulsion system component 206. The air may subsequently flow into a compartment 210 surrounding the air cooling device 188 to vent that compartment; e.g., the inner housing compartment 84.

The air system 36 of the present disclosure may operate in various modes of operation including, for example, a mechanical mode and an electrical mode. During the mechanical mode, referring to FIGS. 5 and 6, each boost compressor 138 may be powered by operation of the turbine engine 24 and its engine core 50. Each BC rotor 166, for example, may be rotationally driven by the respective engine rotating structure 72. By contrast, during the electrical mode, each boost compressor 138 may be powered by operation of the respective electric machine 102 in that same electromechanical apparatus 172. Each BC rotor 166, for example, may be rotationally driven by the respective machine rotor 106. This electrical mode may be particularly useful, for example, when the turbine engine 24 is operating at a low power setting, the respective electric machine 102 is boosting power to the turbine engine 24, and/or the boost compressor(s) 138 are run while the turbine engine 24 is non-operational (e.g., to provide post-shutdown cooling).

Figure 10A:
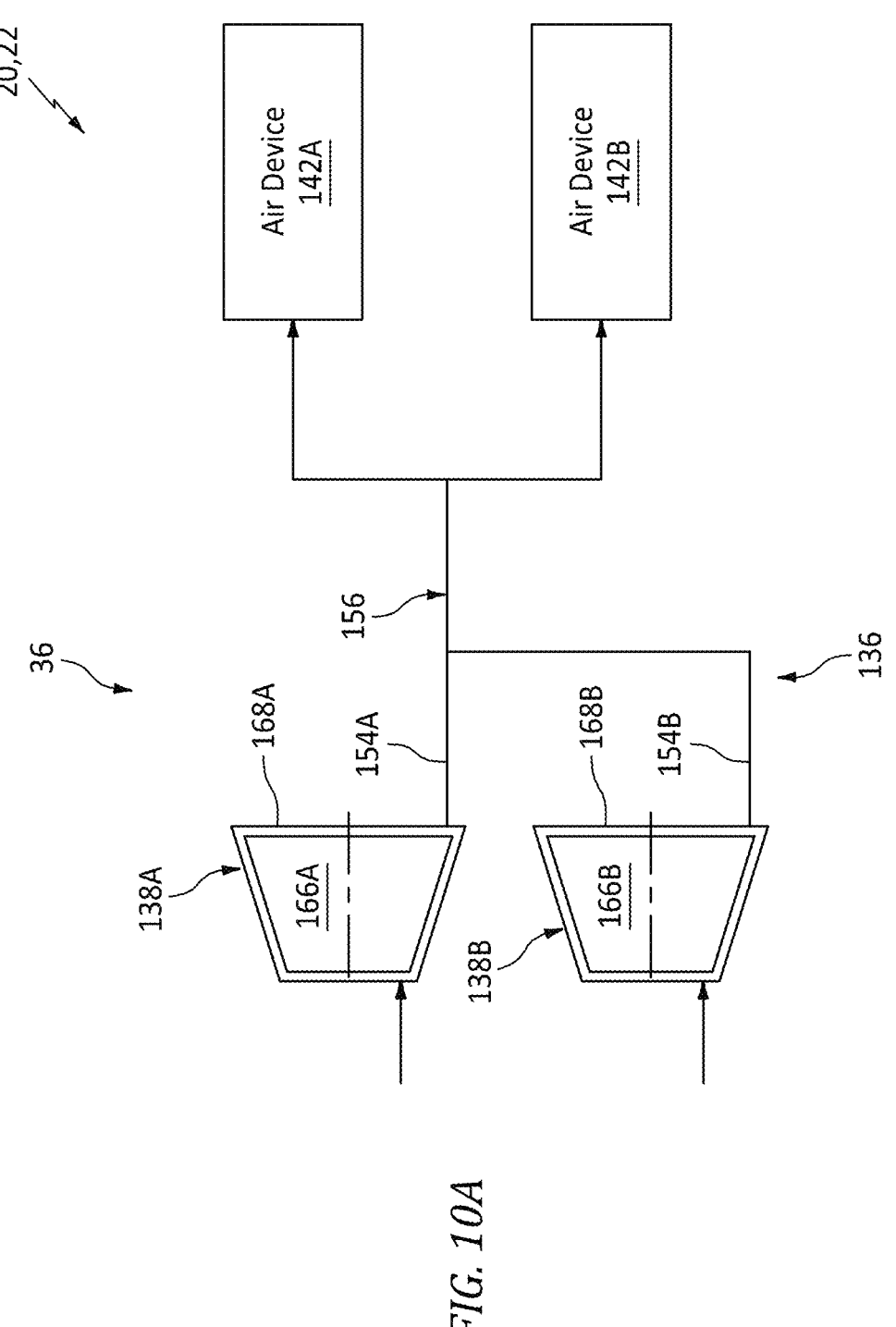
FIGS. 10A and 10B are schematic illustrations of portions of the aircraft propulsion system with various multi-air device arrangements.
Figure 10B:
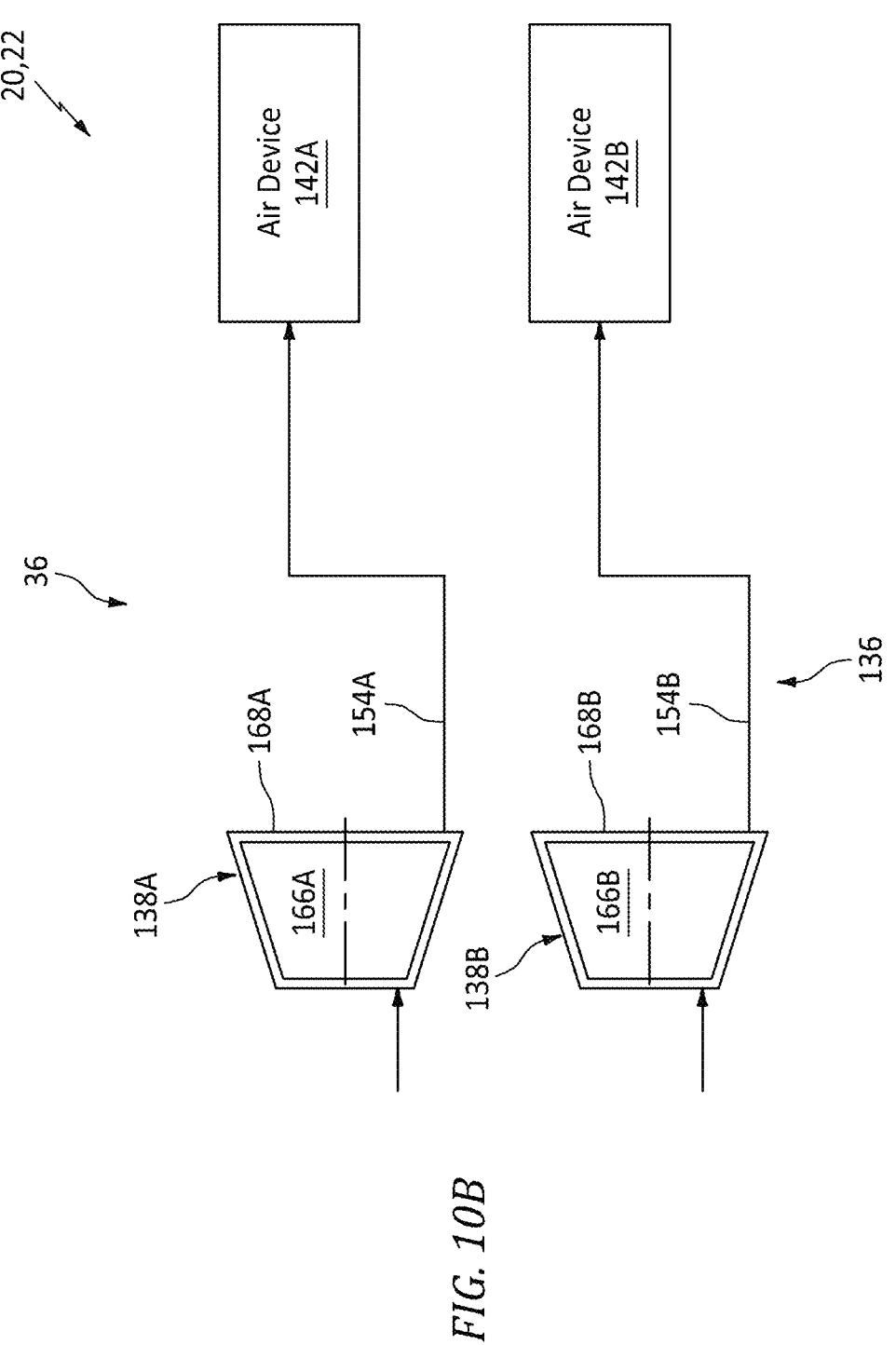

In some embodiments, referring to FIG. 3, the air system 36 may include a single air device 142 receiving the pressurized air from the air circuit 136 and the boost compressors 138. In other embodiments, referring to FIGS. 10A and 10B, the air system 36 may alternatively include multiple of the air devices 142A and 142B (generally referred to as "142") receiving the pressurized air from the air circuit 136 and the boost compressors 138. These air devices 142 may all have a common configuration and/or be located in a common region of the aircraft propulsion system 22. Alternatively, one (or more) of the air devices 142A may have a different configuration and/or may be located in a different region of the aircraft propulsion system 22 than another one (or more) of the air devices 142B. In some embodiments, referring to FIG. 10A, the air devices 142 may be fluidly coupled to and receive air pressurized from multiple of the boost compressors 138. In other embodiments, referring to FIG. 10B, at least one of the air devices 142A may be (e.g., uniquely) associated with one of the boost compressors 138A and at least another one of the air devices 142B may be (e.g., uniquely) associated with another one of the boost compressors 138B. For example, the circuit leg 154A may extend directly to the first air device 142A and the circuit leg 154B may extend directly to the second air device 142B. With such an arrangement, the boost compressors 138 may be individually sized and/or operated for the operating parameters associated with their air devices 142.

While the turbine engine 24 of FIG. 1 is described above with a particular two rotating structure arrangement (e.g., a two-spool architecture), the present disclosure is not limited thereto. For example, the LPC rotor 65 may be omitted to configure the LPT rotor 68 as a power turbine (PT) rotor for the propulsor rotor 64. The turbine engine 24 may also or alternatively include another rotating structure with a bladed compressor rotor in the compressor section 45 and a bladed turbine rotor in the turbine section 47; e.g., an intermediate speed spool for the engine core 50.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for an aircraft powerplant, comprising:

a turbine engine including a core flowpath, a first rotating structure, a compressor section, a combustor section and a turbine section, the core flowpath extending through the compressor section, the combustor section and the turbine section from an airflow inlet into the core flowpath to a combustion products exhaust from the core flowpath, and the first rotating structure comprising a first bladed rotor arranged along the core flowpath in the compressor section or the turbine section; and an accessory system including a first electromechanical apparatus, an air circuit and an air device, the first electromechanical apparatus including a first electric machine and a first boost compressor, the first electric machine comprising a first electric machine rotor that is operatively coupled to the first rotating structure, the first boost compressor comprising a first boost compressor rotor that is operatively and mechanically coupled to the first electric machine rotor and the first rotating structure, and the air circuit configured to direct air received from an air source, through the first boost compressor, to the air device;

wherein one of the first boost compressor rotor is operatively and mechanically coupled to the first rotating structure through the first electric machine rotor; or the first electric machine rotor is operatively and mechanically coupled to the first rotating structure through the first boost compressor rotor.

2. The system of claim 1, wherein the first boost compressor rotor is coaxial with the first electric machine rotor.

3. The system of claim 1, wherein the first electromechanical apparatus is configured such that the first electric machine rotor and the first boost compressor rotor rotate at a common rotational speed.

4. The system of claim 1, wherein the first boost compressor rotor is mechanically coupled to the first electric machine rotor through a clutch.

5. The system of claim 1, further comprising:

an accessory gearbox;

the first electromechanical apparatus mounted to the accessory gearbox; and the first electromechanical apparatus operatively coupled to the first rotating structure through the accessory gearbox.

6. The system of claim 1, wherein the first rotating structure is configured to drive rotation of the first electric machine rotor and the first boost compressor rotor during a first mode of operation; and the first electric machine rotor is configured to drive rotation of the first boost compressor rotor during a second mode of operation.

7. The system of claim 1, further comprising a bypass flowpath bypassing at least one of the compressor section, the combustor section or the turbine section, wherein the bypass flowpath is configured as the air source.

8. The system of claim 7, further comprising:

a housing structure forming a radial peripheral boundary of the bypass flowpath;

wherein an airflow inlet into the air circuit is disposed with the housing structure at the radial peripheral boundary of the bypass flowpath.

9. The system of claim 7, further comprising:

a vane structure extending radially across the bypass flowpath;

wherein an airflow inlet into the air circuit is disposed with the vane structure.

10. The system of claim 1, further comprising a heat exchanger fluidly coupled along the air circuit downstream of the first boost compressor.

11. The system of claim 1, further comprising a housing structure comprising an internal compartment radially outboard of a core of the turbine engine, the core of the turbine engine including the compressor section, the combustor section and the turbine section, and the air device configured to direct the air into the internal compartment.

12. The system of claim 1, further comprising a clearance control system for the turbine engine, the clearance control system comprising the air device.

13. The system of claim 1, wherein the air device is configured to direct the air into a plenum next to the first electric machine to cool the first electric machine.

14. The system of claim 1, further comprising a flow regulator fluidly coupled along the air circuit upstream of the first boost compressor.

15. A system for an aircraft powerplant, comprising:

a turbine engine including a core flowpath, a first rotating structure, a compressor section, a combustor section and a turbine section, the core flowpath extending through the compressor section, the combustor section and the turbine section from an airflow inlet into the core flowpath to a combustion products exhaust from the core flowpath, and the first rotating structure comprising a first bladed rotor arranged along the core flowpath in the compressor section or the turbine section; and

an accessory system including a first electromechanical apparatus, an air circuit and an air device, the first electromechanical apparatus including a first electric machine and a first boost compressor, the first electric machine comprising a first electric machine rotor that is operatively coupled to the first rotating structure, the first boost compressor comprising a first boost compressor rotor that is operatively coupled to the first electric machine rotor and the first rotating structure, and the air circuit configured to direct air received from an air source, through the first boost compressor, to the air device;

wherein the turbine engine further includes a second rotating structure, and the second rotating structure comprises a second bladed rotor arranged along the core flowpath in the compressor section or the turbine section;

wherein the accessory system further includes a second electromechanical apparatus, the second electromechanical apparatus includes a second electric machine and a second boost compressor, the second electric machine comprises a second electric machine rotor that is operatively coupled to the second rotating structure, and the second boost compressor comprises a second boost compressor rotor that is operatively coupled to the second electric machine rotor and the second rotating structure; and wherein the air circuit is configured to further direct the air received from the air source, through the second boost compressor, to the air device.

16. A system for an aircraft powerplant, comprising:

a turbine engine including a core flowpath, a first rotating structure, a compressor section, a combustor section and a turbine section, the core flowpath extending through the compressor section, the combustor section and the turbine section from an airflow inlet into the core flowpath to a combustion products exhaust from the core flowpath, and the first rotating structure comprising a first bladed rotor arranged along the core flowpath in the compressor section or the turbine section; and an accessory system including a first electromechanical apparatus, an air circuit and an air device, the first electromechanical apparatus including a first electric machine and a first boost compressor, the first electric machine comprising a first electric machine rotor that is operatively coupled to the first rotating structure, the first boost compressor comprising a first boost compressor rotor that is operatively coupled to the first electric machine rotor and the first rotating structure, and the air circuit configured to direct air received from an air source, through the first boost compressor, to the air device;

wherein the turbine engine further includes a second rotating structure, and the second rotating structure comprises a second bladed rotor arranged along the core flowpath in the compressor section or the turbine section;

wherein the accessory system further includes a second electromechanical apparatus, the second electromechanical apparatus includes a second electric machine and a second boost compressor, the second electric machine comprises a second electric machine rotor that is operatively coupled to the second rotating structure, and the second boost compressor comprises a second boost compressor rotor that is operatively coupled to the second electric machine rotor and the second rotating structure; and wherein the air circuit is configured to further direct the air received from the air source, through the second boost compressor, to a second air device.

* * * * *

5